Figure 1:
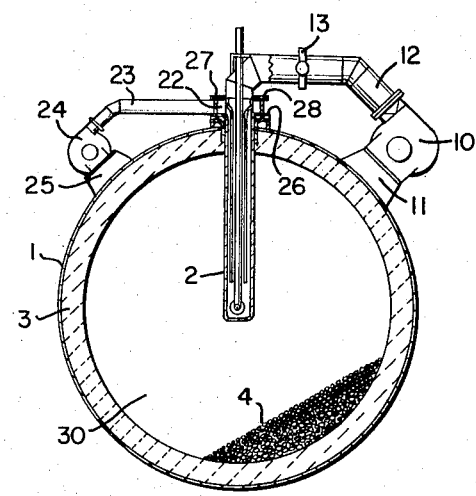

United States Patent [19]
Sherwood

[11] 3,861,859
[45] Jan. 21, 1975

[54] COOLING OF ROTARY FURNACE SHELL BURNER PIPES AND METHOD

[76] Inventor: William Lyon Sherwood, Vancouver, British Columbia, Canada

[22] Filed: July 31, 1972

[21] Appl. No.: 276,750

[52] U.S. Cl. .................................. 432/4, 432/233
[51] Int. Cl. ......................... F23m 5/08, F27b 7/38
[58] Field of Search ........ 432/4, 233, 105; 431/166, 431/238

[56] References Cited
UNITED STATES PATENTS
2,063,233  12/1936  Debuch ........................ 432/105 X Primary Examiner—John J. Camby

[57] ABSTRACT

Overheating of rotary kiln shell burner pipes has resulted in serious deterioration and severely limited service life in a number of operating furnace installations. Various measures have been applied in attempts to solve this problem, but with only limited success. This invention provides a positive solution by use of forced cooling employing an array of high-velocity air jets directed to impinge directly on the inner burner pipe walls. The apparatus includes an assembly of internal cooling header ducting within the burner pipe in an annular configuration, supplied with air under pressure, and equipped with an array of spaced jet nozzle openings through which cooling air jets are directed to impinge on the inner pipe surface, thereby effecting accelerated and continuous cooling of the burner pipe as it operates in the hot furnace atmosphere.

10 Claims, 3 Drawing Figures

PATENTED JAN 21 1975 3,861,859

COOLING OF ROTARY FURNACE SHELL BURNER PIPES AND METHOD

The invention relates to the firing of elongated rotary kiln furnaces and, more particularly, to an improved method and apparatus for the cooling of rotary furnace shell burner pipes inserted into the hot furnace interior.

Shell burner pipes, also often referred to as air pipes, are frequently employed in the operation of rotary furnaces for high-temperature processing, particularly in instances involving applications in the high temperature, solid-state direct reduction of iron ore or pellets of iron ore concentrates. These burner pipes are normally fixed to the outside of the cylindrical steel shell and project through openings in the shell, usually to the furnace axis, where a nozzle is directed axially of the furnace to effect injection of air, and sometimes other blowing media for combustion, such as fuel and oxygen, into the furnace interior. The burners may be supplied with air through suitable ducting from fans or blowers mounted on the shell, or from rotary joints or the like at the end of the furnace.

In a number of large rotary furnace installations to date, service failures of these pipes have been a serious operating problem, necessitating complete shutdowns for burner replacement and repair on a much more frequent basis than would otherwise be required. The principal cause of this failure is overheating of the burner pipe which occurs within the hot furnace environment. The effect is accentuated by superimposed cyclical temperature variations resulting from changes in temperature and heat transfer rate as the burner revolves across the cross-section of the furnace interior, that is, from a location where the burner is entirely in the hot gas atmosphere at the top of the rotation to a location where it is immersed in the charge at the bottom, once during each furnace rotation. In addition, excessively hot burner pipes have tended to act as starting points for charge softening and build-up of charge accretions, resulting in reduced processing efficiency.

In an attempt to overcome these difficulties, various measures have been attempted. These have encompassed shielding of the burner pipe walls on the outside with ceramic coatings and various thicknesses of refractory bricks and castable refractories, varying the diameter and wall thickness of the pipes, use of double-walled pipes, and applications of special high-temperature pipe materials. Although some of these measures have assisted with increasing service life, none of them have been successful in positively eliminating service deterioration and troublesome failures. Some measures have introduced associated supplementary operating problems; for example, refractory coatings substantially increase the actual outer diameter of the burner pipe and also the effective temperature of the outer burner pipe walls, factors resulting in a tendency toward increased generation of fines in the charge and build-up of charge accretions at the burner pipe locations. The most obvious method of forced cooling, involving a water jacket containing circulated cooling water, is difficult and expensive to implement on the rotating furnace shell.

It is therefore a principal object of the present invention to provide means for the positive cooling of rotary furnace shell burner pipes and avoid excessively high temperatures of the pipes, thereby reducing the incidence of service failure through overheating, increasing the service life, and lessening the incidence of accretion formation on the burner pipes.

It is another object of the invention to realize a substantially positive and continuously constant cooling of the burner pipes which is maintained regardless of changes in the rate of blowing air or other gases for combustion through the burner pipes.

It is a still further object of this invention to accomplish the above objects on a practical and sound economic basis without introducing attendant operating problems or deleterious mechanical effects on rotary furnace process operation.

The method of this invention is to direct high-velocity gaseous cooling media, normally air, to impinge directly upon the inner walls of rotary furnace shell burner pipes operating within the hot furnace interior, and thereby lower the burner wall temperature to a point safely below the maximum service operation temperature of the burner pipe material. The cooling media issues from pressurized cooling header ducting by way of an array of cooling air jet nozzle openings so spaced as to obtain effective coverage and realize direct impingement over a large part of the burner pipe inner surface, covering at least those areas subjected to excessively high temperatures and having consequent susceptibility to service deterioration and failure.

The apparatus comprises an external blower or equivalent pressurizing device, appropriate ducting to deliver the pressurized cooling media to the burner inlet, an arrangement of internal cooling header ducting within the burner pipe, and an array of spaced cooling air jet nozzle openings positioned in close proximity to the inner burner walls and directed so that the pressurized cooling media exits from the cooling header ducting and impinges directly on the inner walls of the burner pipe.

In the preferred embodiment, a plurality of internal cooling header duct pipes are arranged longitudinally in concentric annular relation to the burner pipe walls and are joined together and terminate at the burner inlet in a common external supply header pipe ring, in turn supplied with pressurized cooling media through a connecting duct from a pressure blower. Two or three longitudinal rows of circular holes, approximately equally spaced along each row and staggered between rows, comprise the cooling air jet nozzle system. The forced cooling assembly is centrally positioned within the burner pipe by means of annular spacing rings connecting between header duct pipes and concentric with the burner pipe, and appropriate centering guide brackets, attached either to the inner burner walls, or to the assembly, but not to both, so as to allow free differential expansion longitudinally between the burner pipe and cooling assembly.

Figure 3:
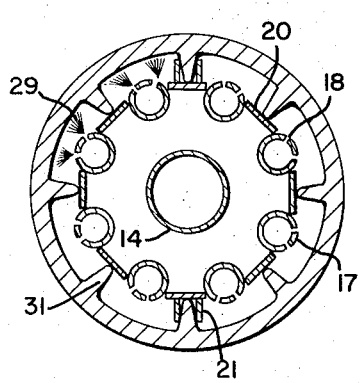
Figure 2:
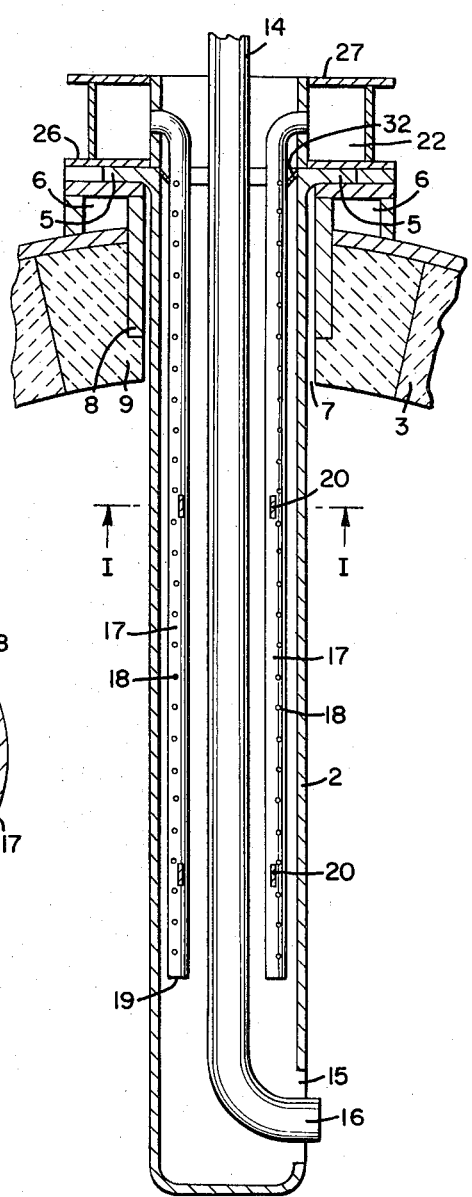

Various other objects, features of and advantages of the method and apparatus of this invention will become apparent from the following detailed description and claims, and by referring to the accompanying drawing, in which:

FIG. 1 is a cross-section of the rotary furnace at the location of the burner pipe showing the general arrangement of the burner pipe and cooling apparatus in relation to the rotary furnace; FIG. 2 is a longitudinal section through the furnace burner pipe showing the forced air jet cooling apparatus of this invention; and FIG. 3 is a transverse section of the burner pipe and cooling apparatus along the line I—I of FIG. 1.

Referring to the drawings, the entire burner apparatus is mounted on the outer steel shell 1 of the rotary kiln furnace, which is lined with a refractory brick lining 3, and adapted for passage of a bed of charge material 4. The shell burner pipe 2, generally consisting of a heat-resisting alloy such as 25–20 Cr-Ni steel, is mounted to project radially through furnace shell opening into the interior furnace atmosphere 30, and terminates in an approximately right-angled burner nozzle opening 15, firing longitudinally along the furnace axis. The burner pipe inlet flange 5 is bolted to burner support flange 6, which is attached and integral with the furnace shell. A cylindrical inner refractory protection ring 8 is mounted within the shell to maintain clearance between the burner pipe and shell opening, and prevent movement of refractory to bear directly on the outer walls of the burner pipe 2. Whereas the refractory brick lining 3 normally comprises successive rings of individual kiln brick shapes, the refractory burner block 9 surrounding the protection ring 8 most suitably consists of a rammed castable refractory mix. A ceramic fibre or other suitable soft refractory packing may also be placed in the shell opening annular space 7 between the protection ring 8 and the burner pipe 2.

Combustion air is supplied from a combustion air fan 10, which is attached to the kiln shell by air fan support base 11. The fan is driven by an electric motor supplied with power via sliding ring contactors mounted on the kiln shell, in known manner. The air is blown to the burner via combustion air supply duct 12, equipped with air flow control valve 13, usually of the butterfly type. Fuel such as natural gas or oil, or gaseous oxygen, can be supplied by an internal fuel pipe 14 which is conveniently concentric and centrally located within the burner pipe 2 as illustrated, terminating in fuel pipe nozzle opening 16. The air may also be enriched with oxygen, such as by injection into air supply duct 12.

The forced cooling assembly comprises cooling header ducting, in the embodiment illustrated consisting of a plurality of internal cooling header ducts 17, each of which is blanked off by end blanks 19, and contains an array of cooling jet nozzle openings 18 spaced along its length, from which the cooling air jets 29 exit at high velocity to impinge on the inner wall of burner pipe 2. The cooling jet nozzle openings 18 consist of circular holes as illustrated, or may take various other forms known in the art of nozzles. Various nozzle spacings may also be employed. In the embodiment illustrated, in which the burner pipe is equipped with internal longitudinal fins as strengthening members and to assist in cooling, eight lengths of standard pipe are employed as circular internal header ducts 17, each equipped with two rows of nozzle openings 18 directed at 30° off-center. Equal nozzle spacing on each row, with staggered spacing between rows, provides suitably uniform coverage. Exterior to the furnace, the internal cooling header ducts 17 are supplied with air under pressure from external supply header ring pipe 22, in turn supplied through cooling air supply duct 23 connected to cooling air blower 24, which is attached to the furnace shell 1 by blower support mounting 25.

The internal cooling header ducts 17 are positioned in relation to each other by annular spacing rings 20 in two or more locations along their length, and at the top, inlet end terminate in common supply header ring pipe 22, thus forming an integral cooling header assembly. The inner flange 26 of header ring pipe 22 is bolted or otherwise fixed to burner support flange 6, and the cooling header assembly is held in a central position within the burner pipe 2 by means of centering guide brackets 21. This arrangement maintains the cooling jet pattern while freely allowing differential thermal expansion between the internal cooling header ducts 17 and the burner pipe 2. The outer flange 27 of external supply header ring pipe 22 is bolted to the end flange 28 of the cooling air supply duct, thus forming a continuous conduit for combustion air. An annular, anti-interference baffle 32 can also be incorporated into the assembly to minimize flow interference between cooling air and combustion air.

In operation, a single furnace may have a plurality of burners, each having individual fans for combustion air and cooling air. Alternatively, a single fan may supply a plurality of burners. The vital consideration is that adequate volume and pressure is made available to the cooling assembly of each individual burner.

For most efficient cooling, cooling air blowers should generally deliver pressures on the order of 30 inches water column or higher, and should be on the order of twice or more of the pressure delivered by the combustion air blower, with a similar minimum ratio for the pressures within the internal header duct and shell burner pipe respectively. For effective cooling, the impingement velocity of the air jets normally should exceed 100 feet per second and a velocity of 150–200 feet per second combines the attributes of effective cooling with reasonable pressurizing costs. Likewise, a composite nozzle jet opening area in the range of 1 to 5 per cent of the cooled interior burner pipe surface area, and a distance between nozzle openings and interior pipe walls in the range of 4 to 15 times the nozzle opening diameter, are ranges consistent with high heat transfer rates and acceptably moderate cooling air consumption.

The application of the invention and operating parameters combining effective cooling with moderate cost can be illustrated by way of an example, as follows:

Rotary furnace: 13 feet diameter, 9 inches of 70 per cent alumina brick refractory lining;

Burner pipe: 11 inches diameter, ⅝ inches wall thickness, and eight 1 — inch longitudinal internal cooling fins;

Cooling air blower — 500 cubic feet per minute at 36 inches water column,

Combustion air fan — 5,000 cubic feet per minute at 12 inches water column;

Internal cooling header ducts — 8 pipes — 1 ½ inches diameter schedule 40 pipe;

Cooling jet nozzles — 2 rows per duct, at 60° apart, each row on 2 — inch centers, staggered, total of 60 jets per duct, nozzle holes one-eighth inches in diameter;

Header ring pipe — 5 inches diameter;

Materials — burner pipe stainless 25 - 20 chrome-nickel cast — internal header ducts — stainless 304 pipe.

Using an uncooled pipe blowing air at the rate of 5,000 cubic feet per minute, the heat transfer coefficient between the combustion air and the inner wall of the burner pipe can be shown to be on the order of 15 btu per hour per square foot per degree F. According to the above example, the forced jet cooling results in an overall coefficient of approximately 45 btu per hour, or a three-fold increase. Assuming furnace conditions resulting in an average burner wall temperature of 2,200° F. without forced cooling, which is close to the service limit of most high-temperature alloys, use of the forced cooling lowers this to substantially below 2,000° F.

It will be appreciated that a preferred embodiment of the apparatus for forced cooling of rotary furnace shell burners has been described and illustrated and that variations and modifications may be made by persons skilled in the art, without departing from the spirit and scope of the invention defined in the appended claims.

I claim:

1. In a rotary furnace in which blowing media for combustion is supplied through a shell burner pipe projecting radially into the furnace interior, the method for cooling the burner pipes comprising the steps of:
   a. positioning cooling header ducting within the shell burner pipe adjacent the inner burner pipe walls and supplying gaseous cooling media to said cooling header ducting;
      maintaining said gaseous cooling media under a greater positive pressure within said cooling header ducting than the pressure of said blowing media for combustion within said shell burner pipe;
   c. directing jets of said gaseous cooling media at substantial velocity in an array of cooling media jets impinging directly against the inner side walls of said burner pipe, said jets issuing from an array of jet nozzle openings in said cooling header ducting.

2. The method according to claim 1 in which the impingement velocity of said gaseous cooling media exceeds 100 feet per second.

3. The method according to claim 1 in which said pressure of the gaseous cooling media within said header ducting is at least twice as great as the average pressure of said blowing media for combustion within the burner pipe.

4. The method according to claim 1 in which said positive pressure and thereby the impingement velocity of said gaseous cooling media is maintained substantially constant, independently of the velocity of the blowing media for combustion flowing through said burner pipe, to maintain the forced cooling effect regardless of the firing rate of said blowing media for combustion.

5. In a rotary kiln furnace employing at least one shell burner pipe projecting radially into the furnace interior through which blowing media is introduced for combustion, forced cooling apparatus comprising:
   a. cooling header ducting positioned within and along the length of said burner pipe adjacent to and at a selected distance from, those portions of the inner burner pipe walls subject to overheating;
   b. gaseous cooling media supply means, for supplying and maintaining gaseous cooling media under pressure within said cooling header ducting;
   c. an array of spaced cooling jet nozzle openings in the walls of said cooling header ducting for directing said gaseous cooling media in the form of an array of directly impinging multiple high velocity jets directly against the inner side walls of said burner pipe.

6. An apparatus according to claim 5 in which said cooling header ducting is fixed in relation to the shell burner only at the inlet end of said burner, allowing free differential thermal expansion of said ducting axially of said burner pipe.

7. The apparatus according to claim 5 in which the composite area of said jet nozzle openings is in the range of 1 to 5 per cent of the total area of the interior surface of said burner pipe covered by the array of cooling jets.

8. The apparatus according to claim 5 in which the distance between the jet nozzle openings and the interior walls of said burner pipe is in the range of four to 15 times the diameter of the individual jet nozzle openings.

9. The apparatus according to claim 5 in which said header ducting comprises a plurality of internal cooling header ducts positioned longitudinally in a concentric annular arrangement and substantially parallel to the inner burner pipe walls, each internal cooling header duct being equipped with a portion of said array of spaced cooling jet nozzle openings.

10. An apparatus according to claim 9 in which said internal cooling header ducts are joined together with at least one set of annular spacing rings within the burner pipe, and said ducts communicate with and join in a common external supply header pipe ring fixed rigidly at the burner inlet, which is supplied with pressurized cooling media via a separate cooling media supply duct, said internal cooling header ducts, annular spacing rings and header pipe ring comprising an integral assembly which is fastened in fixed relation to the burner at the burner inlet, and along the burner pipe interior length allows for free longitudinal movement as caused by differential thermal expansion between said integral assembly and burner pipe.

* * * * *